(12) United States Patent
Vogel et al.

(10) Patent No.: US 7,471,867 B2
(45) Date of Patent: Dec. 30, 2008

(54) FIBER OPTIC SPLICE AND DISTRIBUTION ENCLOSURE

(75) Inventors: Mark Vogel, Statesville, NC (US); Todd Andrew Newhouse, Rohnert Park, CA (US); William Anthony Pender, Hollywood, FL (US); Ronald Howard Diego, Boca Raton, FL (US)

(73) Assignee: Commscope Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/798,642

(22) Filed: May 15, 2007

(65) Prior Publication Data

US 2008/0285933 A1    Nov. 20, 2008

(51) Int. Cl.
G02B 6/00 (2006.01)

(52) U.S. Cl. ............... 385/135; 385/134; 385/136; 385/137

(58) Field of Classification Search ............... 385/135
See application file for complete search history.

(56) References Cited

U.S. PATENT DOCUMENTS

| 5,097,529 A | 3/1992 | Cobb et al. |
| 5,652,820 A | 7/1997 | Glaser et al. |
| 6,766,094 B2 | 7/2004 | Smith et al. |
| 2005/0002633 A1 | 1/2005 | Solheid et al. |
| 2005/0271344 A1 * | 12/2005 | Grubish et al. ............... 385/135 |
| 2005/0281526 A1 | 12/2005 | Vonseng et al. |
| 2006/0193587 A1 | 8/2006 | Wittmeier et al. |
| 2007/0047896 A1 | 3/2007 | Kowalczyk et al. |

* cited by examiner

*Primary Examiner*—Hemang Sanghavi
*Assistant Examiner*—Kajli Prince
(74) *Attorney, Agent, or Firm*—Muncy, Geissler, Olds & Lowe, PLLC (57) ABSTRACT

An enclosure for housing fiber optic splices between a fiber optic distribution cable and fiber optic customer drop cables includes a first door providing access to a first area of the enclosure housing couplers for receiving terminals of customer drop cables. The enclosure also includes a second door providing access to a second area of the enclosure for accommodating slices in one or more distribution cables. The second area is not accessible via the first area.

18 Claims, 10 Drawing Sheets

FIBER OPTIC SPLICE AND DISTRIBUTION ENCLOSURE

BACKGROUND OF THE INVENTION

1. Field of the Invention

The present invention relates to an enclosure for fiber optic cables. More particularly, the present invention relates to a field-based enclosure, where a fiber optic distribution cable is spliced to one or more fiber optic customer drop cables.

2. Description of the Related Art

In the communications industry, fiber optic communication is becoming very popular. Fiber optic cables offer higher bandwidth and lower signal loss compared to conventional twisted pair cables and coaxial cables. In a typical fiber optic cable system for providing communication services to customers, a fiber optic distribution cable which may contain four, eight or more optical fibers is buried underground along a street or perhaps strung above ground along utility poles. At geographically spaced intervals, a technician splices a fiber optic customer drop cable to a fiber of the distribution cable. For example, at a property line between a first and second office building, the technician may tap into the distribution cable and connect several customer drop cables for the first office building and several customer drop cables for the second office building to a single one of the optical fibers in the distribution cable.

The splices must be protected from the elements. Typically, the splices are housed inside an underground enclosure or vault, such as the vault illustrated in U.S. Pat. No. 5,652,820, which is hereby incorporated by reference.

SUMMARY OF THE INVENTION

Applicants have appreciated one or more drawbacks associated with the designs of the prior art. The typical vault has one access mechanism to open it. Opening the vault exposes the splices of the distribution cable or cables, the splitter for the customer drop cables, and the connections to the customer drop cables. Applicants have appreciated that installers and service technicians would desire separate doors to access separate areas within the enclosure. Applicants have appreciated that it is advantageous to separate the distribution side of the enclosure from the drop side of the enclosure, so as to organize the areas within the enclosure to better facilitate installation, servicing and maintenance procedures. Also, the distribution side door could be lockable to prohibit access to the distribution cable(s) and/or splitter(s), such that those parts are not accessible to the customer drop side installers so that the distribution cable(s) and/or splitter(s) will not be tampered with or damaged when installing or servicing customer drop cables.

Applicants have also appreciated a need in the art for an enclosure which is simple in design, rugged, moisture resistant, easy to manufacture and/or inexpensive to manufacture.

It is an object of this invention to address one or more of the drawbacks of the prior art vaults and/or one or more of the Applicants' appreciated needs in the art.

The present invention provides an enclosure for housing fiber optic splices between a fiber optic distribution cable and fiber optic customer drop cables which includes a first door providing access to a first area of the enclosure housing couplers for receiving terminals of customer drop cables. The enclosure also includes a second door providing access to a second area of the enclosure for accommodating splices in one or more distribution cables. The second area is not accessible via the first area.

These and other objects may be accomplished by a fiber optic cable splice enclosure comprising: a first access door attached to said enclosure and having a closed condition and an open condition which provides access to a first area within said enclosure for housing at least one fiber optic customer drop cable; a second access door attached to said enclosure and having a closed condition and an open condition which provides access to a second area within said enclosure for housing at least one fiber optic distribution cable, wherein said second area is manually inaccessible from said first area; a plurality of fiber optic couplers located within said first area for receiving terminals of customer drop cables; and a splitter residing within a portion of said enclosure, said splitter including a fiber optic input and a plurality of fiber optic outputs, several of said plurality of fiber optic outputs being respectively coupled to individual couplers of said plurality of fiber optic couplers.

Also, these and other objects may be accomplished by a fiber optic cable splice enclosure comprising: a first access door attached to said enclosure and having a closed condition and an open condition which provides access to a first area within said enclosure for housing at least one fiber optic customer drop cable; a second access door attached to said enclosure and having a closed condition and an open condition which provides access to a second area within said enclosure for housing at least one fiber optic distribution cable, wherein said second area is manually inaccessible from said first area; a plurality of fiber optic couplers located within said first area for receiving terminals of customer drop cables; a third area formed between said first area and said second area, wherein said third area is bordered by a first bulkhead between said first area and said third area and a second bulkhead between said second area and said third area; a splitter residing within said third area, said splitter including a fiber optic input and a plurality of fiber optic outputs, several of said plurality of fiber optic outputs being respectively coupled to individual couplers of said plurality of fiber optic couplers; a plurality of first holder slots formed in or attached to said first bulkhead and facing said first area for holding one or more splices on one or more customer drop cables; and a plurality of second holder slots formed in or attached to said second bulkhead and facing said second area for holding one or more splices on one or more distribution cables.

Moreover, these and other objects may be accomplished by a fiber optic cable splice enclosure comprising: a first access door attached to said enclosure and having a closed condition and an open condition which provides access to a first area within said enclosure for housing at least one fiber optic customer drop cable; a second access door attached to said enclosure and having a closed condition and an open condition which provides access to a second area within said enclosure for housing at least one fiber optic distribution cable, wherein said second area is manually inaccessible from said first area, wherein said first access door forms a first side of said enclosure, and wherein said second access door forms a second and opposite side of said enclosure; a plurality of fiber optic couplers located within said first area for receiving terminals of customer drop cables; a splitter residing within a portion of said enclosure, said splitter including a fiber optic input and a plurality of fiber optic outputs, several of said plurality of fiber optic outputs being respectively coupled to individual couplers of said plurality of fiber optic couplers, wherein said splitter is located outside of said first area of said enclosure; and a third side of said enclosure forming a cable entrance and exit side for passage of one or more customer drop cables and one more distribution cables.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Figure 1:
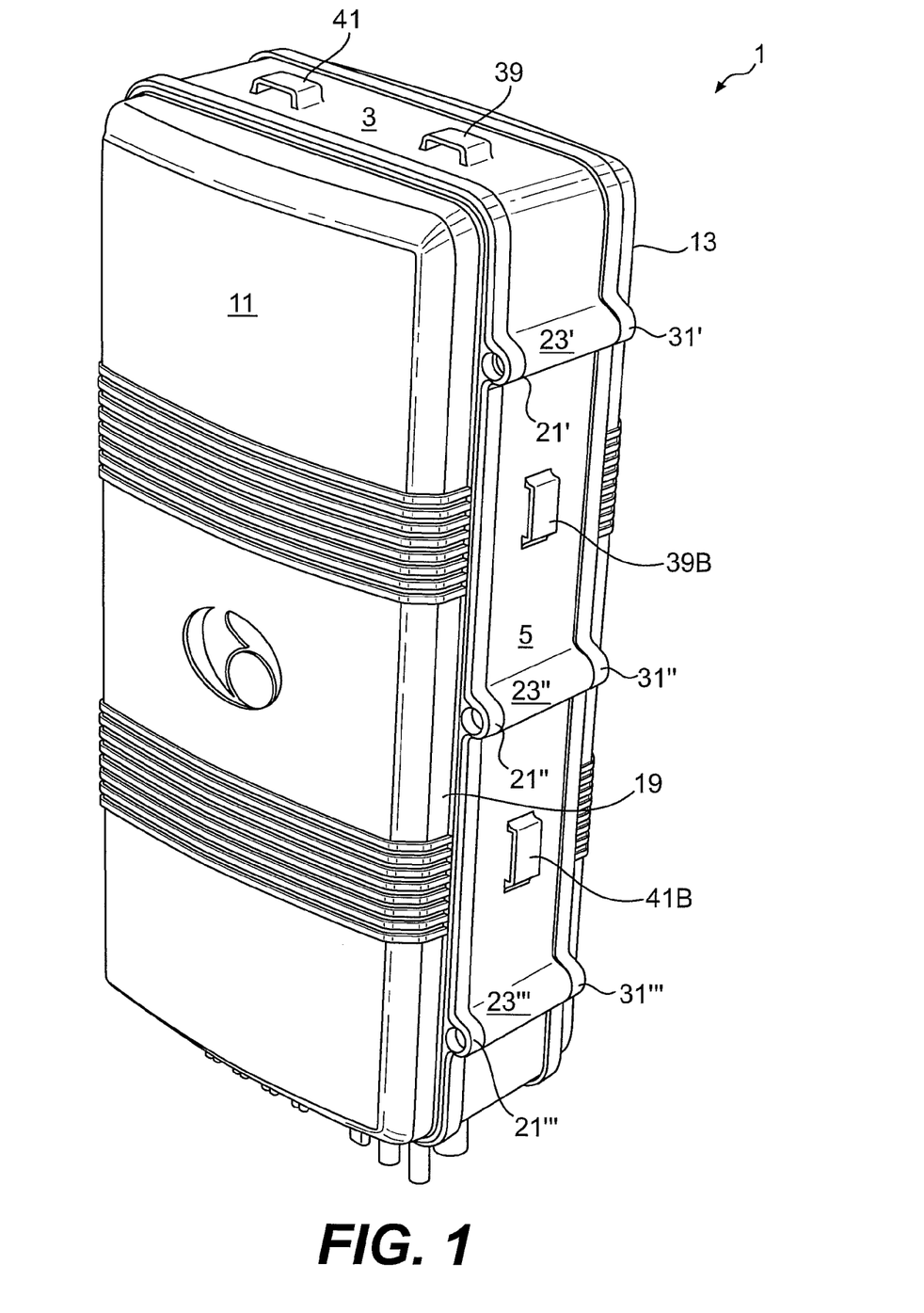
FIG. 1 is a front perspective view of a fiber optic cable splice enclosure, in accordance with the present invention.
Figure 2:
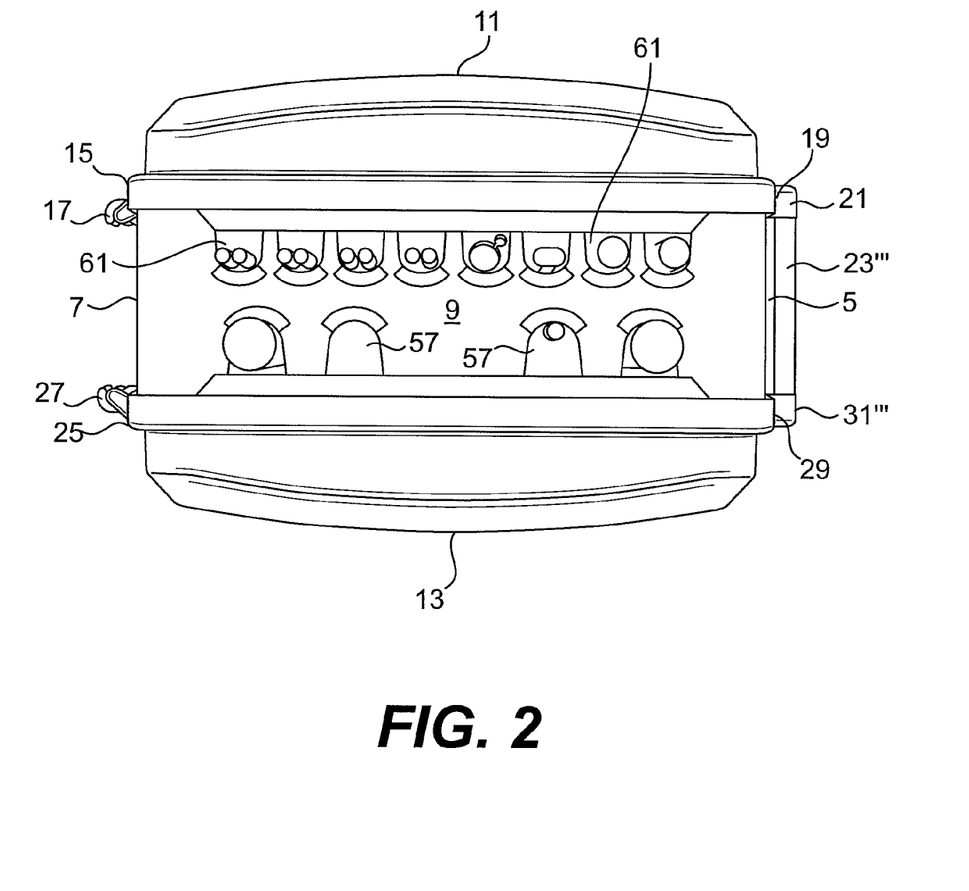
FIG. 2 is a bottom view of the fiber optic cable splice enclosure of FIG. 1 illustrating the cable entrance and exit side of the enclosure.
Figure 3:
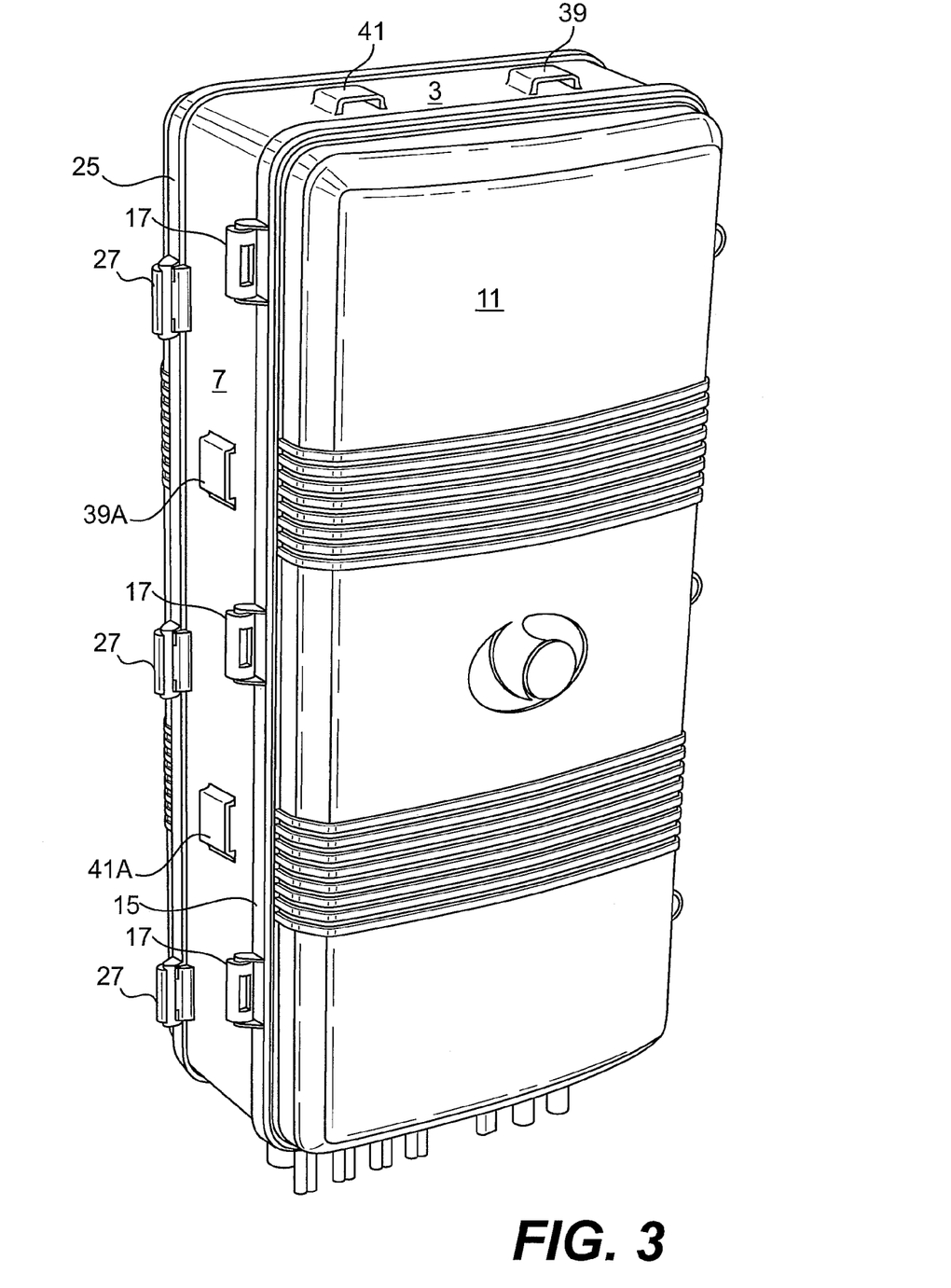
FIG. 3 is a front perspective view of a fiber optic cable enclosure illustrating an a removable access door embodiment.

FIGS. 1-3 illustrate a fiber optic cable splice enclosure 1, in accordance with the present invention. The enclosure 1 includes a top side 3, a right side 5, a left side 7, and a bottom side 9. A first access door 11 is connected to the enclosure 1 and forms a front or first side of the enclosure 1. A second access door 13 is connected to the enclosure 1 and forms a back or second side of the enclosure 1, opposite to the first side of the enclosure 1.

FIG. 2 is a bottom view of the enclosure 1. As best seen in FIG. 2, the first access door 11 is generally formed as a panel having one side edge 15 connected to the left side 7 of the enclosure 1 by at least one hinge 17. An opposite side edge 19 of the first access door 11 includes first through third through holes 21', 21" and 21'''.

The first access door 11 has a closed condition and an open condition. When the first access door 11 is in the closed condition, the first through third through holes 21', 21" and 21''' align with first through third threaded bosses 23', 23" and 23''' attached to, or integrally formed with, the right side 5 of the enclosure 1, such that a respective screw or bolt (or a specialty fastener, such as a tamper resistant torx head screw) may be passed through the aligned first through third through holes 21', 21" and 21''' and engaged within the threaded bosses 23', 23" and 23''' to secure the first access door 11 in the closed condition. Preferably, the door includes a gasket which seals the first access door 11 when the first access door 11 is in the closed condition. When the first access door 11 is in the open condition, access is provided to a first area within the enclosure 1, as will be discussed below.

The second access door 13 is generally formed as a panel having one side edge 25 also connected to the left side 7 of the enclosure 1 by at least one hinge 27. An opposite side edge 29 of the second access door 13 includes fourth through sixth through holes 31', 31" and 31'''.

The second access door 13 has a closed condition and an open condition. When the second access door 13 is in the closed condition, the fourth through sixth through holes 31', 31" and 31''' align with the first through third threaded bosses 23', 23" and 23''' attached to, or integrally formed with, the right side 5 of the enclosure 1, such that a respective screw or bolt may be passed through the aligned fourth through sixth through holes 31', 31" and 31''' and engaged within the threaded bosses 23', 23" and 23''' to secure the second access door 13 in the closed condition. When the second access door 13 is in the open condition, access is provided to a second area within the enclosure 1, as will be discussed below.

Although the first and second access doors 11 and 13 have been illustrated as being attached to the enclosure 1 by hinges 17 and 27, it is envisioned that one or both of the first and second access doors 11 and 13 could be attached to the enclosure 1 by other types of mechanisms. For example, the hinges 17 and 27 may be replaced by tabs attached to, or integrally formed with, the first access door 11. The tabs pass through and partially overlap edges of slots formed in the left side 7 of the enclosure 1. When the first access door 11 is attached to the enclosure 1 by the illustrated hinges 17 and 27 or by the tabs and slots, the first access door 11 may optionally be completely removed from the enclosure 1 once the screws are removed from the first through third through holes 21', 21" and 21''' and the door is pivoted to a fully open position. Of course the second access door 13 may be similarly attached to the enclosure 1.

The top side 3 of the enclosure 1 includes first and second looped portions 39 and 41 attached thereto, or integrally formed therewith. The left side 7 includes third and fourth looped portions 39A and 41A. The right side 5 includes fifth and sixth looped portions 39B and 41B. The first through sixth looped portions 39, 41, 39A, 41A, 39B and 41B may be used to secure the enclosure 1 to a field fixture during use.

Figure 4:
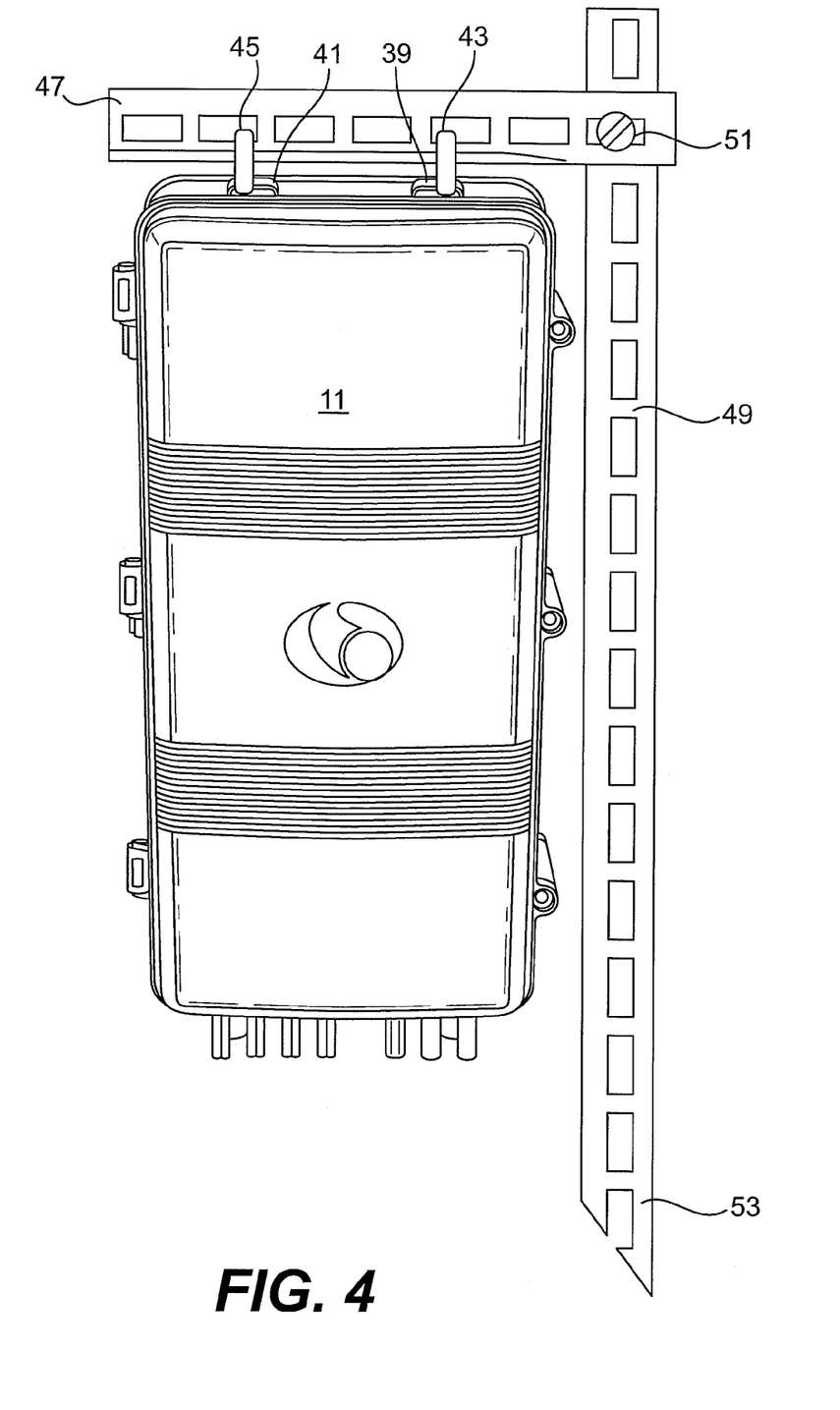
FIG. 4 is a front view illustrating one method of mounting the enclosure.

FIG. 4 illustrates one situation wherein the first and second looped portions 39 and 41 are employed. A first plastic zip or cable tie 43 is passed through the first looped portion 39 and also passed through a perforation in a first perforated angle iron 47. A second cable tie 45 is passed though the second looped portion 41 and another perforation in the first perforated angle iron 47. Hence, the enclosure 1 is securely fastened to the first perforated angle iron 47.

The first perforated angle iron 47 may be secured to a second perforated angle iron 49 by one or more fasteners 51. The second perforated angle iron 49 may be attached to the side of an aerial pole in the case of an aerial mounting of the enclosure 1. Alternatively, an end 53 of the second perforated angle iron 49 may be embedded in concrete or dirt when the enclosure 1 is to be mounted inside of a weather resistant ground enclosure, as located near a street and lot line. In other words, a second metal or plastic enclosure would cover the enclosure 1 and angle irons 47 and 49 so as to make a more presentable and orderly appearance and provide additional protection. Of course, the third and fourth looped portions 39A and 41A or the fifth and sixth looped portions 39B and 41B could be used to mount the enclosure 1 in a horizontal orientation, as opposed to the illustrated vertical orientation. Also, the second perforated angle iron 49 could be eliminated and the first perforated angle iron 47 could be directly attached to a mounting structure. Of course, there are other types of mounting fixtures besides perforated angle irons which could be employed. A particular advantage to using the fifth and sixth looped portions 39B and 41B to mount the enclosure 1 in a horizontal orientation is that once opened, the first and/or second access doors 11 and 13 would be held open by gravity. By this arrangement, a technician would not need to expend effort to hold the first and/or second access doors 11 and 13 open.

Turning again to FIG. 2, the bottom side 9 of the enclosure 1 will be described in more detail. The bottom side 9 includes ports for the entry and exit of fiber optic cables. A first portion in the bottom side 9 includes a plurality of large ports 57 for receiving a plurality of distribution cables. The ports 57 may be constructed of a gasket material (e.g. rubber or foam). The gasket material presents a slight resistance to passage of a distribution cable through a port 57 therein, which results in a moisture and contamination resistant enclosure 1.

Each port 57 may optionally include a plurality of precut rings. The gasket material within one or more of the precut rings may be removed so as to size the port 57 to the diameter of an entering or exiting distribution cable. By this manner, it would also be possible to size one of the ports 57 to receive any size distribution cable, or even a smaller sized drop cable. In the illustration of FIG. 2, the leftmost and rightmost bottom ports are sized to receive a distribution cable, and the next to the rightmost bottom port 57 is sized to receive a drop cable.

The bottom side 9 also includes a second portion which includes a plurality of small ports 61 for receiving a plurality of customer drop cables. The ports 61 may be constructed of a gasket material (e.g. rubber or foam). The gasket material presents a slight resistance to passage of a smaller diameter customer drop cable through a port 61 therein, which results in a moisture and contamination resistant enclosure 1. In the illustration of FIG. 2, the two rightmost top ports 61 have been sized to receive larger diameter cables to illustrate the flexibility provided to the installer. Precut rings within the gasket material could also be present within the ports 61.

Figure 5:
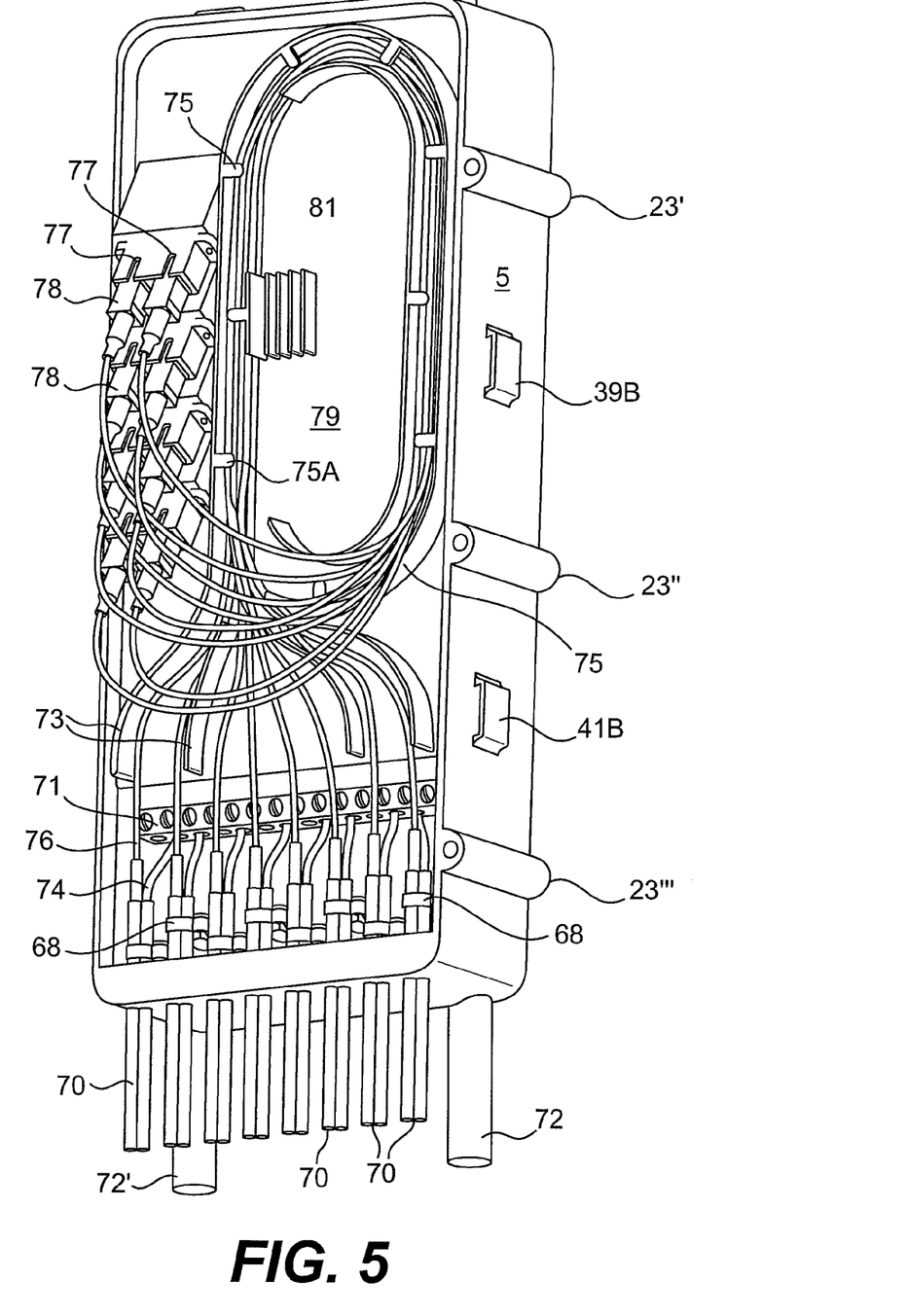
FIG. 5 is a front perspective view of the fiber optic cable splice enclosure with a first access door removed illustrating terminated jacketed customer drop cable connections.

FIG. 5 is a perspective view of the enclosure 1 with the first access door 11 removed to provide access to the first area within the enclosure 1. FIG. 5 also illustrates outgoing customer drop cables 70, an incoming distribution cable 72 and an outgoing distribution cable 72'.

The customer drop cables 70 enter the bottom side 9 of the enclosure via the ports 61. In the embodiment of FIG. 5, each customer drop cable 70 is a jacketed cable including a strength member 74 (such as a metallic wire or fiberglass wire) and a jacketed fiber optic cable 76 having a connector or terminal 78 at the end of the jacketed fiber optic cable 76.

After entering the enclosure 1, each customer drop cable 70 is secured by a cable tie 68. The cable tie 68 wraps around the customer drop cable 70 and through loop holes formed within the enclosure 1 so as to secure the customer drop cable 70 to the enclosure 1. The strength members 74 are immediately connected to a ground bar 71 located proximate the entrance of the customer drop cables 70. Some cables, such as all dielectric cable designs, include strength members 74 formed of fiberglass, and such fiberglass strength member 74 would also be connected to the ground bar 71. Some cables are of an armor design. For an armored cable, the armor would be exposed, flattened and punched down onto a stud which would tie into the ground bar 71 or ground plate 71P by a screw (see FIG. 10). By such an arrangement, the armor of the cable could be mechanically and/or electrically connected to the ground bar 71 or ground plate 71P.

The jacketed fiber optic cables 76 pass by entrance guides 73 and into loop guides 75. The entrance guides 73 and loop guides 75 are mounted to a first bulkhead 79, which defines a back of the first area within the enclosure 1. The loop guides 75 ensure that a bend of the jacketed fiber optic cables 76 remains greater than a recommended minimum bend radius for the jacketed fiber optic cables 76 and accommodate the storage of any slack in the jacketed fiber optic cables 76. Tabs 75A are provided at the top ends of the loop guides 75 to keep the jacketed fiber optic cables 76 inside the loop guides 75. After leaving the loop guides 75, the terminals 78 at the ends of the jacketed fiber optic cables 76 are plugged into respective ones of couplers 77. The term "coupler" is intended to be a broad term encompassing any device adapted to receive a fiber optic cable's termination, including bulkhead adaptors.

The couplers 77 are mounted to the first bulkhead 79. Having the couplers 77 mounted to the first bulkhead 79 allows a technician to easily remove any or all of the terminals 78 and to clean the terminals 78 and/or couplers 77 without exposing equipment behind the first bulkhead 79, as will be discussed hereinafter. Preferably, the couplers 77 are mounted at an acute angle to a plane of the first bulkhead 79, such as at an angle of about 30 to 45 degrees. Therefore, the couplers 77 receive the terminals 78 at an acute angle relative to the plane of said first bulkhead 79 in order to preserve the minimum bend radius constraints of the jacketed fiber optic cables 76. Although FIG. 5 illustrates eight couplers 77, more or fewer couplers may be included on the first bulkhead 79, such as four couplers 77 or sixteen couplers 77.

Figure 6:
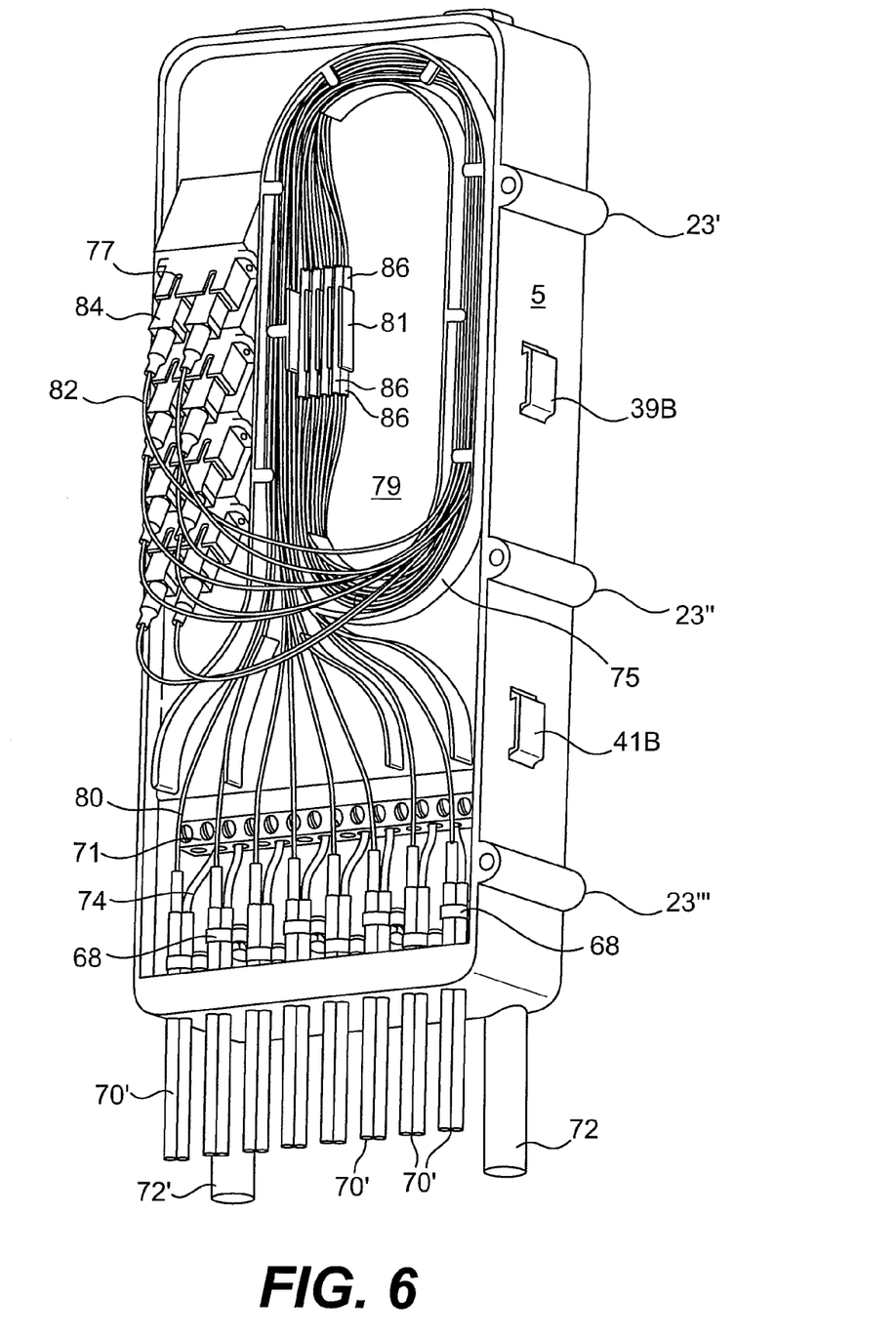
FIG. 6 is a front perspective view similar to FIG. 5, but illustrating spliced unjacketed customer drop cable connections.

FIG. 6 is a perspective view similar to FIG. 5, but illustrates the use of alternative customer drop cables 70'. The alternative customer drop cables 70' are very similar to the customer drop cables 70 which included a factory terminated connector at the end. However, the alternative customer drop cables 70' do not include a factory terminated connector; rather, a connector is spliced on in the field during the installation process. The actual cable portion of the two cable customer drop cable designs 70 and 70' may otherwise be identical. The alternative customer drop cables 70' enter the bottom side 9 of the enclosure via the ports 61. In the embodiment of FIG. 6, each alternative customer drop cable 70' is a jacketed cable including a strength member 74 and a buffered optical fiber 80. The buffered optical fiber optical 80 has no terminal 78 at its end. An installation technician must splice on an extra buffered optical fiber 82 having a terminal 84 at its end to each of the buffered optical fibers 80.

Each splice is protected by a splice sleeve 86. The first bulkhead 79 includes a plurality of holder slots 81 attached thereto or integrally formed therewith. The holder slots 81 are sized to snugly receive the splice sleeve 86 therein and two or more splice sleeves 86 may be stacked into each holder slot 81.

By the above arrangement, the enclosure 1 may accommodate either pre-terminated customer drop cables 70' or non-terminated customer drop cables 70' requiring splicing or combinations of the two types of customer drop cables 70 and 70'. This is particularly advantageous as some customers demand the pre-terminated type of cables 70, while other customers demand the non-terminated type cables 70'.

Figure 7:
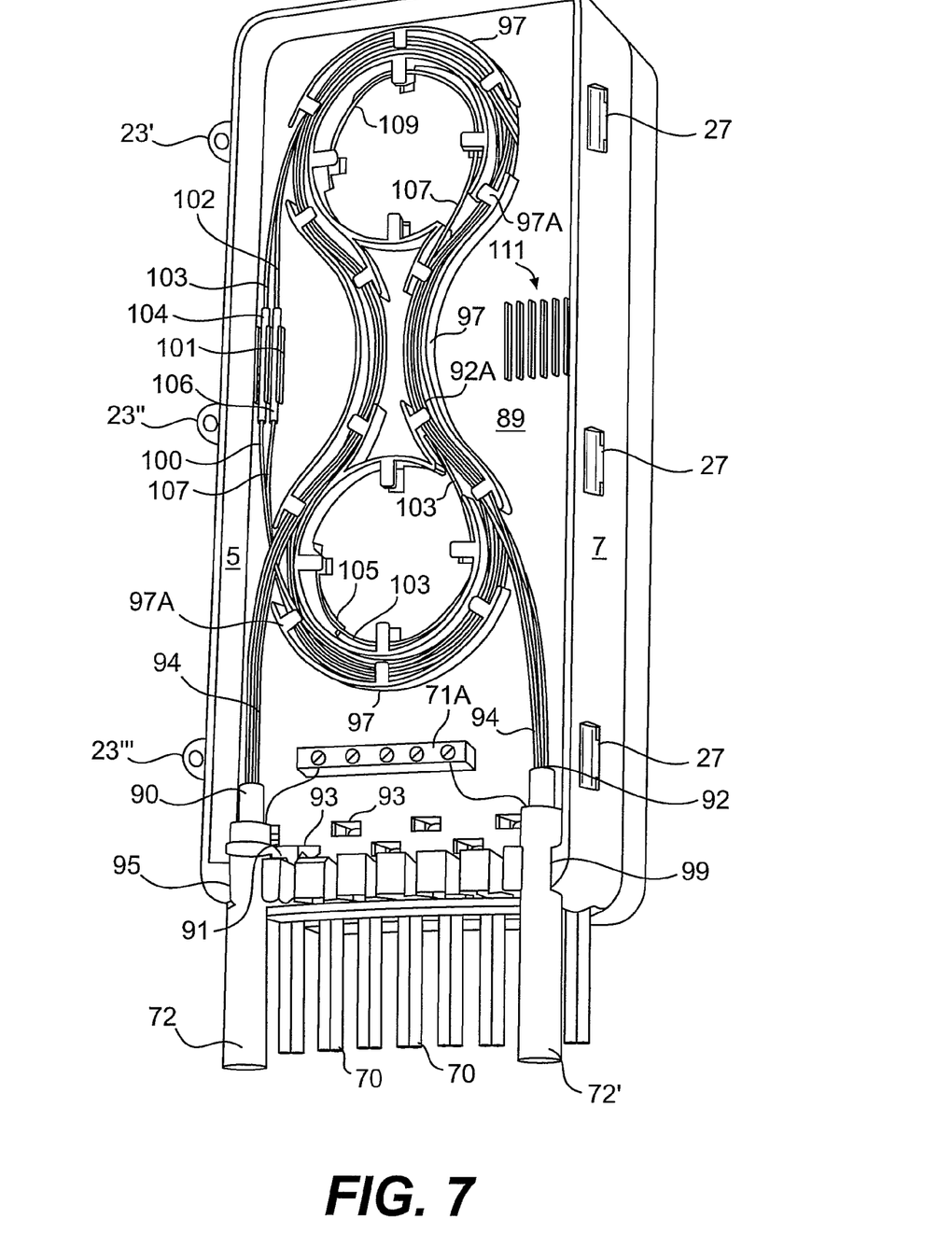
FIG. 7 is a rear perspective view of the fiber optic cable splice enclosure with a second access door removed illustrating the handling of a distribution cable.

FIG. 7 is a back view of the enclosure 1 with the second access door 13 removed to expose a second area within the enclosure. The second area is manually inaccessible from the first area. The incoming distribution cable 72 in the illustrated embodiment of FIG. 7 includes eight fiber optic cables 94. The incoming distribution cable 72 may be secured to the enclosure 1 by a cable tie 91 passing through holes 93 formed in a second bulkhead 89 and which are provided near the entrance port 57 for the incoming distribution cable 72. If the incoming distribution cable 72 includes a strength member, the strength member may be attached to a grounding bar 71A provided in the second area, in an identical manner as illustrated with regard to the ground bar 71 in FIG. 5. Of course, other types of cables can be terminated to the ground bar 71, such as armored cables, all dielectric cables, and well as other types of known cables.

The outgoing distribution cable 72' in the illustrated embodiment includes the same eight fiber optic cables 94. The outgoing distribution cable 72' may also be secured to the enclosure 1 by a cable tie (not illustrated) passing through holes 93 provided near the exit port 57 for the outgoing distribution cable 72'. If the outgoing distribution cable 72' includes a strength member, the strength member may also be attached to the grounding bar 71A in the second area.

Next, the manner by which the distribution cable installer forms the configuration illustrated in FIG. 7 will be described. Several feet of jacket is carefully removed from the distribution cable 72 to expose the inner eight fiber optic cables 94 from a first jacket edge 90 to a second jacket edge 92. The distribution cable installer inserts the incoming distribution cable 72 through an open slot 95 communicated to a port 57 and into the port 57 such that the first jacket edge 90 is located within the enclosure 1 and a few inches from the port 57. The incoming distribution cable 72 is held in the port 57 and prevented from leaving the open slot 95 slot by the cable tie 91.

The eight exposed fiber optic cables 94 are routed behind top tabs 97A and through loop guides 97, attached to or integrally formed with the second bulkhead 89, which neatly organize the cable slack and ensure that a minimum bend radius is not exceeded. Entrance guides, as shown in FIG. 5, may also be included in the second area to guide the fiber optic cables 94 to the loop guides 97. Although eight fiber optic cables 94 are illustrated, the distribution cable 72 could have more or fewer than eight fiber optic cables, such as twelve fiber optic cables. Next, the distribution cable installer inserts the outgoing distribution cable 72' through an open slot 99 and into another port 57 such that the second jacket edge 92 is located within the enclosure 1 and a few inches from the port 57. At this point in the installation process the functionality of the distribution cable 70 has not been altered, e.g., none of the eight fiber optic cables 94 have been cut or spliced.

Next, the distribution cable installer removes one cable of the eight fiber optic cables 94 from the guides 97 and cuts the selected fiber optic cable. The incoming portion 100 of the selected fiber optic cable, which extends from the incoming distribution cable 72, is spliced to a first preexisting fiber optic cable 103 which passes through the guides 97 and into a first opening 105 formed in the second bulkhead 89. The outgoing portion 102 of the selected fiber optic cable, which extends into the outgoing distribution cable 72', is spliced to a second preexisting fiber optic cable 107 which passes through the guides 97 and into a second opening 109 formed in the second bulkhead 89.

The splice between the incoming portion 100 and the first preexisting fiber optic cable 103 is covered by a first splice sleeve 104. The splice between the outgoing portion 102 and the second preexisting fiber optic cable 107 is covered by a second splice sleeve 106. The first and second splice sleeves 104 and 106 are held within a first set of holder slots 101 attached to or integrally formed with the second bulkhead 89. The second bulkhead 89 also includes a second set of holder slots 111, which are unused in the embodiment illustrated in FIG. 7.

Figure 8:
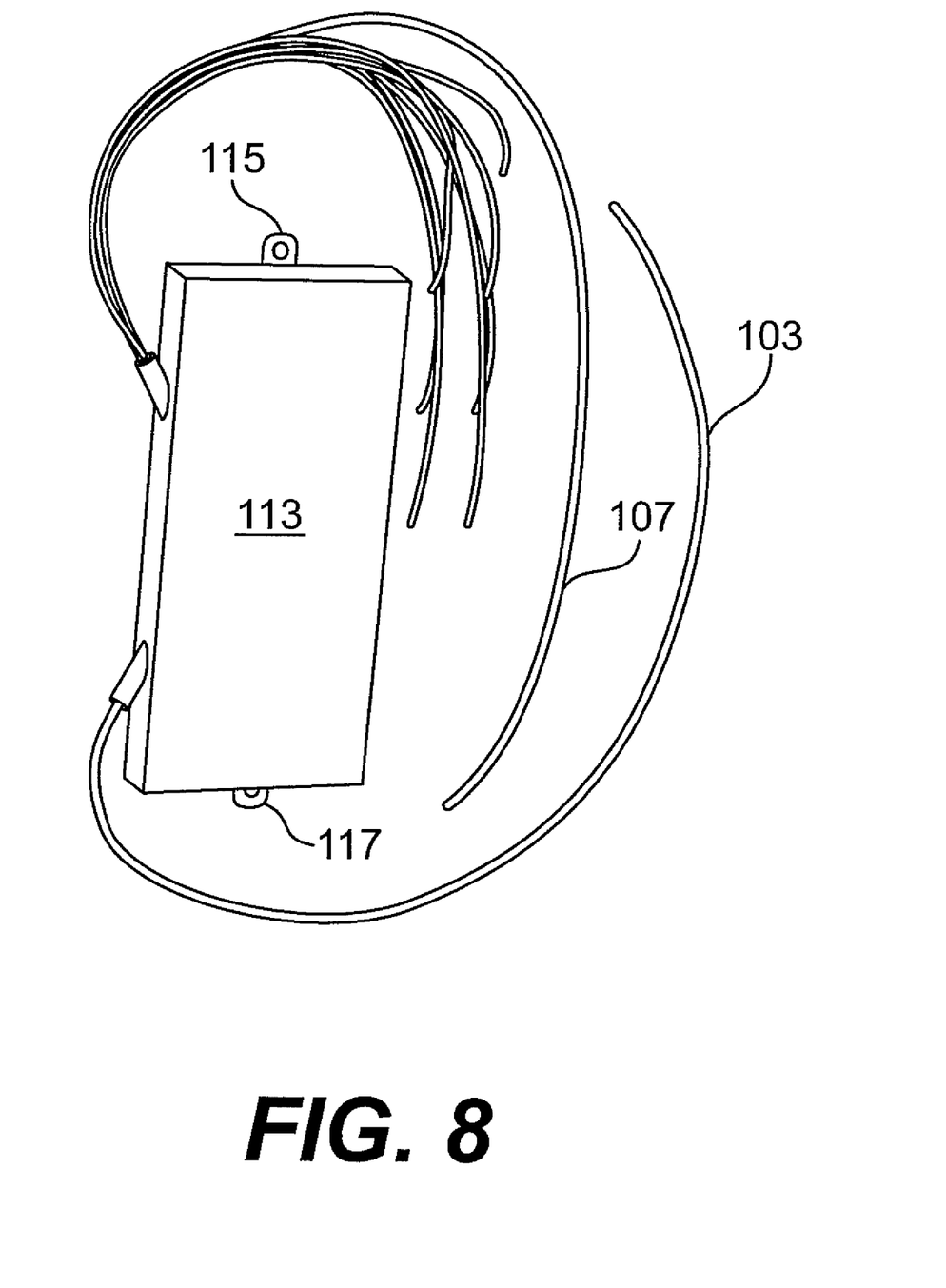
FIG. 8 is a perspective view of a splitter.

Between the first bulkhead 79 (FIG. 5) and the second bulkhead 89 (FIG. 7) there resides a third area. The third area is separated from the first area by the first bulkhead 79 and is separated from the second area by the second bulkhead 89. The third area houses a splitter 113, as illustrated in FIG. 8.

The splitter 113 has one input 103 (which is the same element as the first preexisting fiber optic cable 103) and nine outputs which are spliced to the one input 103. One output of the nine outputs is the second preexisting fiber optic cable 107. The remaining eight outputs of the nine outputs are connected to respective ones of the eight couplers 77 attached to the first bulkhead 79. By this arrangement, the incoming portion 100 of the selected fiber optic cable is spliced to the outgoing portion 102 of the selected fiber optic cable and also to each of the eight couplers 77 in the first area of the enclosure 1. A first fastener feature 115 and a second fastener feature 117 (such as screws, tabs or clips) are attached to the splitter 113.

The splitter 113 is a commercially available part. Therefore, structural details of the splitter 113 will not be described in greater detail. The term "splitter" as used herein is a broad term and is meant to encompass any device which receives an optical input signal and provides multiple optical output signals (e.g. 2, 3, 4, 8, 16 output signals) based upon the received input signal. A splitter may be a symmetrical or nonsymmetrical device, wherein one of the output signals has more signal strength than another of the output signals of the splitter. The splitter may be a passive or active device, e.g., powered or non-powered. Again, such splitters are known in the art and reference may be made to prior patents for the internal configuration of such "splitter" devices.

Figure 9:
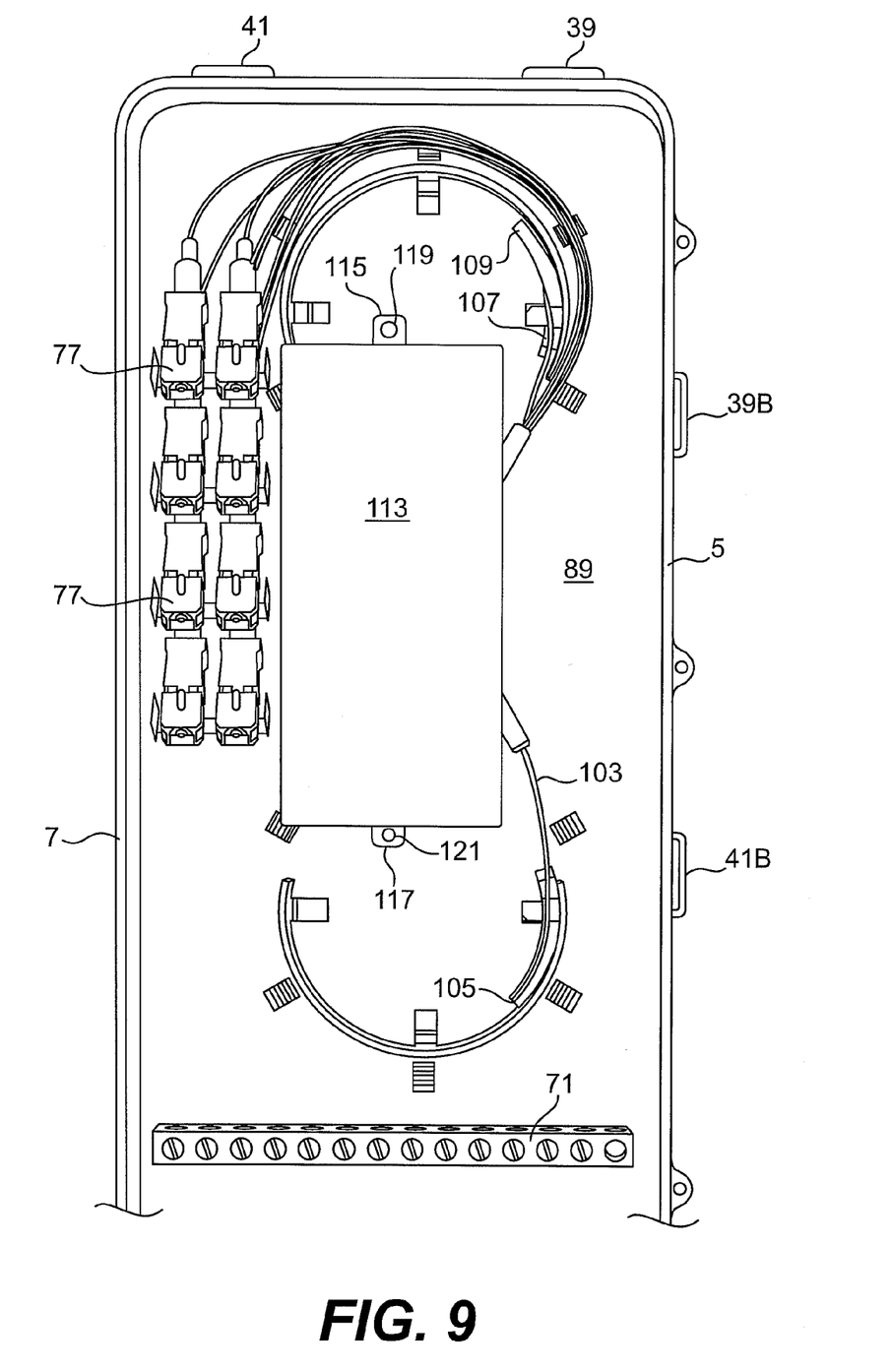
FIG. 9 is front perspective view of the enclosure with the first access door and a first bulkhead removed to illustrate the connections of the splitter.

FIG. 9 is a partial cutaway view of the front of the enclosure 1 with the first access door 11 and the first bulkhead 79 removed to illustrate the connections between the splitter 113 and the couplers 77. FIG. 9 also illustrates a first fastener 119 cooperating with the first fastener feature 115 and a second fastener 121 cooperating with the second fastener feature 117 to attach the splitter 113 to the second bulkhead 89. Clips could be used to secure the splitter 113 to the second bulkhead instead of screws. It should be appreciated that fewer couplers 77 could be employed on the first bulkhead 79. For example, four couplers 77 could be placed on the first bulkhead 79, whereby the splitter 113 would have one input and five outputs. Also, more couplers 77 could be employed on the first bulkhead 79. For example, sixteen couplers 77 could be placed on the first bulkhead 79, whereby the splitter 113 would have one input and seventeen outputs.

Figure 10:
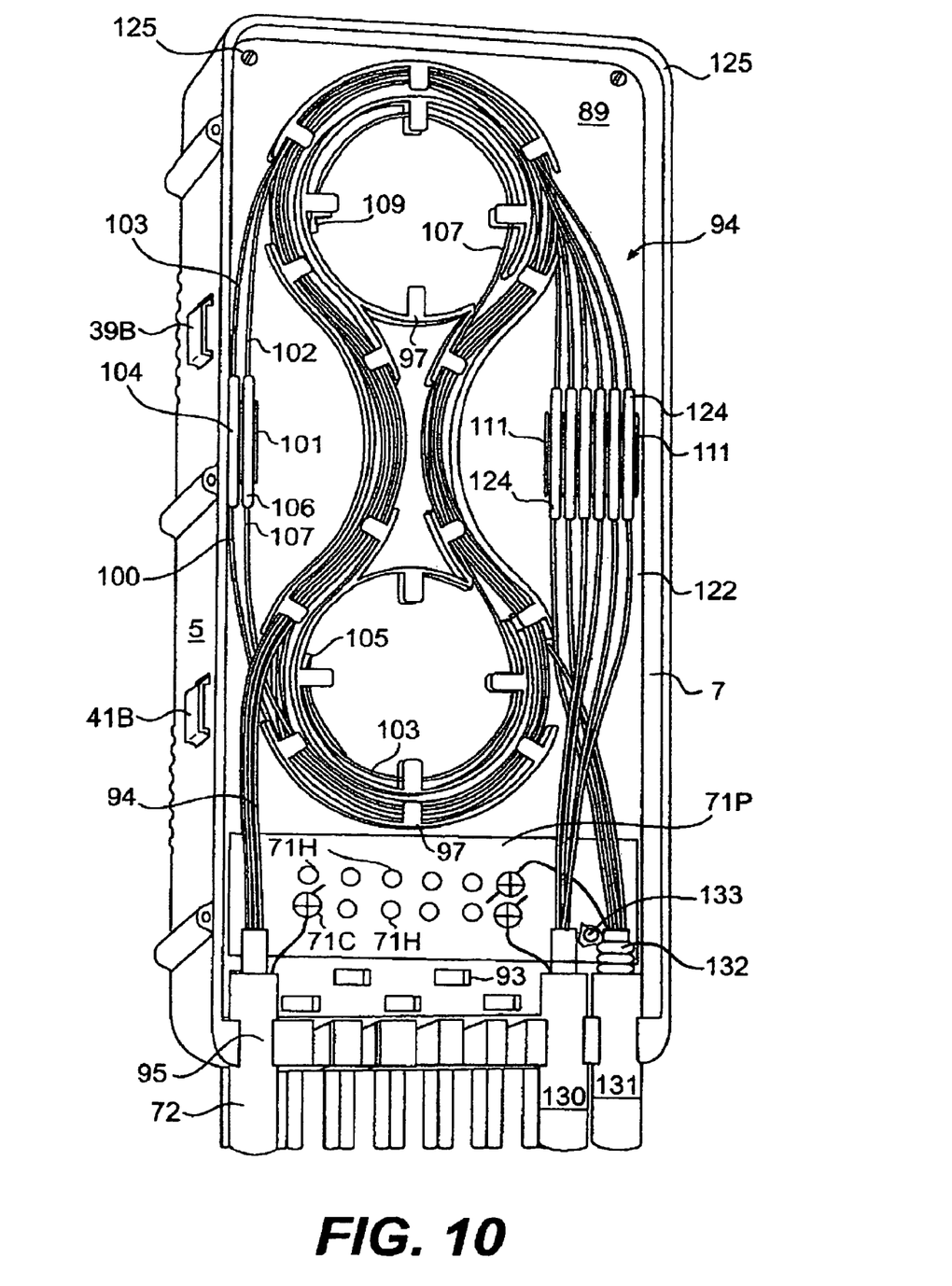
FIG. 10 is a rear perspective view similar to FIG. 7, but illustrating the splicing of a single incoming distribution cable to two outgoing distribution cables.

FIG. 10 is a back view of the enclosure 1 with the second access door 13 removed to expose the second area within the enclosure 1 in accordance with an alternative embodiment of the invention. Like elements have the same reference numerals as in FIG. 7. The incoming distribution cable 72 in the alternate embodiment of FIG. 10 includes eight fiber optic cables 94; however, the outgoing distribution cable 72' with eight fiber optic cables (FIG. 7) has been replaced with two outgoing distribution cables 130 and 131, each with four fiber optic cables.

Basically, the eight fiber optic cables 94, which would have passed into a single outgoing distribution cable 72', have been spliced into the eight fiber optic cables 122 of the two smaller outgoing distribution cables 130 and 131. The splices are protected by eight splice sleeves 124. The holder slots 111 have a sufficient depth such that two or more splice sleeves 124 may be stacked into each holder slot. Hence, in FIG. 10, two of the six illustrated holder slots 124 are holding two stacked splice sleeves 124. Therefore, the distribution installer can splice distribution cables inside of the enclosure 1 which improves the flexibility of the system and options available to the installer. Although eight total holder slots 101 and 111 are illustrated on the second bulkhead 89, more holder slots may be included so that distribution cables with more fiber optic cables may be spliced within the enclosure 1.

The second bulkhead 89 may be removably attached to the enclosure 1 via fasteners 125, such as clips or screws. Therefore, the second bulkhead 89 may be moved relative to said enclosure 1 to access the splitter 113. Alternatively, or in addition, the first bulkhead 79 could be removably attached to the enclosure 1 by similar fasteners in a same manner. In either event, a technician could gain access to the splitter 113, by either removing a bulkhead 79 or 89 or tilting a bulkhead away from the enclosure so as to test, service and/or replace the splitter 113.

FIG. 10 also illustrates a preferred alternative design for the ground bar 71A. The grounding bar 71A of FIG. 7 has been replaced with a ground plate 71P, which may be formed of sheet metal. The ground plate 71P includes threaded holes 71H which are sized to receive threaded capstan bosses 71C, such as screws with oversized heads. The capstan bosses 71C could be formed of metal, but are more preferably formed of plastic. As illustrated in FIG. 10, the strength members 74 of incoming and outgoing cables 72, 130 and 131 are captured by friction between the capstan bosses and the ground plate 71P. If a strength member 74 is metallic it can be effectively grounded to the ground plate 71P. Also, if a cable, such as cable 131 includes an armor layer 132, the armor layer 132 may be pulled back, flattened and screwed to the ground plate 71P with a screw 133. In a preferred embodiment, the ground bar 71 of FIGS. 5 and 6 could also be replaced by a sheet metal ground plate and capstan bosses, as illustrated in FIG. 10.

Spatially relative terms, such as "under", "below", "lower", "over", "upper", "lateral", "left", "right" "horizontal" and "vertical" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic cable splice enclosure comprising:
   a first access door attached to said enclosure and having a closed condition and an open condition which provides access to a first area within said enclosure for housing at least one fiber optic customer drop cable;
   a second access door attached to said enclosure and having a closed condition and an open condition which provides access to a second area within said enclosure for housing at least one fiber optic distribution cable, wherein said second area is manually inaccessible from said first area;
   a plurality of fiber optic couplers located within said first area for receiving terminals of customer drop cables;
   a splitter residing within a portion of said enclosure, said splitter including a fiber optic input and a plurality of fiber optic outputs, several of said plurality of fiber optic outputs being respectively coupled to individual couplers of said plurality of fiber optic couplers, wherein said splitter is located outside of said first area of said enclosure; and a third area formed between said first area and said second area, wherein said third area is bordered by a first bulkhead between said first area and said third area and a second bulkhead between said second area and said third area, and wherein said splitter resides within said third area.

2. The fiber optic cable splice enclosure of claim 1, wherein said plurality of fiber optic couplers are attached to said first bulkhead, and further comprising:
a guide track for guiding customer drop cables within said first area at bends greater than a minimum bend radius of the customer drop cables and for storing slack in the customer drop cables.

3. The fiber optic cable splice enclosure of claim 2, wherein said plurality of fiber optic couplers receive terminals at an acute angle relative to a plane of said first bulkhead.

4. The fiber optic cable splice enclosure of claim 1, further comprising:
a plurality of holder slots formed on or attached to said first bulkhead and facing said first area for holding one or more splice sleeves on one or more customer drop cables.

5. The fiber optic cable splice enclosure of claim 1, further comprising:
a plurality of holder slots formed on or attached to said second bulkhead and facing said second area for holding one or more splice sleeves on one or more distribution cables.

6. The fiber optic cable splice enclosure of claim 1, wherein said splitter is connected to said second bulkhead.

7. The fiber optic cable splice enclosure of claim 6, wherein at least one of said first and second bulkheads is removably attached to said enclosure via fasteners and may be moved relative to said enclosure to access said splitter.

8. The fiber optic cable splice enclosure of claim 1, wherein said first access door forms a first side of said enclosure, and wherein said second access door forms a second and opposite side of said enclosure.

9. The fiber optic cable splice enclosure of claim 8, wherein said first access door is generally formed as a panel having one side edge connected to said enclosure by at least one hinge.

10. The fiber optic cable splice enclosure of claim 8, wherein said first access door is generally formed as a panel which is removably mounted to said enclosure.

11. The fiber optic cable splice enclosure of claim 8, wherein said second door includes plural through holes therein, and said enclosure includes plural threaded bosses, and wherein said plural through holes are in alignment with said plural threaded bosses when said second door is in the closed condition.

12. The fiber optic cable splice enclosure of claim 1, further comprising:
a grounding bar or plate located within said first area provided for grounding of conductive strength members and armor of armored cables, and for tie down of dielectric strength members.

13. The fiber optic cable splice enclosure of claim 1, wherein said enclosure includes a cable entrance and exit side for passage of one or more customer drop cables and one more distribution cables, wherein said cable entrance and exit side includes a gasket to resist moisture from entering said enclosure.

14. A fiber optic cable splice enclosure comprising:
a first access door attached to said enclosure and having a closed condition and an open condition which provides access to a first area within said enclosure for housing at least one fiber optic customer drop cable;
a second access door attached to said enclosure and having a closed condition and an open condition which provides access to a second area within said enclosure for housing at least one fiber optic distribution cable, wherein said second area is manually inaccessible from said first area;
a plurality of fiber optic couplers located within said first area for receiving terminals of customer drop cables;
a third area formed between said first area and said second area, wherein said third area is bordered by a first bulkhead between said first area and said third area and a second bulkhead between said second area and said third area;
a splitter residing within said third area, said splitter including a fiber optic input and a plurality of fiber optic outputs, several of said plurality of fiber optic outputs being respectively coupled to individual couplers of said plurality of fiber optic couplers;
a plurality of first holder slots formed in or attached to said first bulkhead and facing said first area for holding one or more splice sleeves on one or more customer drop cables; and
a plurality of second holder slots formed in or attached to said second bulkhead and facing said second area for holding one or more splice sleeves on one or more distribution cables.

15. The fiber optic cable splice enclosure of claim 14, wherein said plurality of fiber optic couplers are attached to said first bulkhead, and further comprising:
a guide track for guiding customer drop cables within said first area at bends greater than a minimum bend radius of the customer drop cables and for storing slack in the customer drop cables.

16. The fiber optic cable splice enclosure of claim 14, wherein said first access door forms a first side of said enclosure, and wherein said second access door forms a second and opposite side of said enclosure.

17. A fiber optic cable splice enclosure comprising:
a first access door attached to said enclosure and having a closed condition and an open condition which provides access to a first area within said enclosure for housing at least one fiber optic customer drop cable;
a second access door attached to said enclosure and having a closed condition and an open condition which provides access to a second area within said enclosure for housing at least one fiber optic distribution cable, wherein said second area is manually inaccessible from said first area, wherein said first access door forms a first side of said enclosure, and wherein said second access door forms a second and opposite side of said enclosure;
a plurality of fiber optic couplers located within said first area for receiving terminals of customer drop cables;
a splitter residing within a portion of said enclosure, said splitter including a fiber optic input and a plurality of fiber optic outputs, several of said plurality of fiber optic outputs being respectively coupled to individual couplers of said plurality of fiber optic couplers, wherein said splitter is located outside of said first area of said enclosure;
a third side of said enclosure forming a cable entrance and exit side for passage of one or more customer drop cables and one or more distribution cables; and
a third area formed between said first area and said second area, wherein said third area is bordered by a first bulkhead between said first area and said third area and a second bulkhead between said second area and said third area, and wherein said splitter resides within said third area.

18. The fiber optic cable splice enclosure of claim 17, wherein said plurality of fiber optic couplers are attached to said first bulkhead, and further comprising:

a guide track for guiding customer drop cables within said first area at bends greater than a minimum bend radius of the customer drop cables and for storing slack in the customer drop cables.

* * * * *